United States Patent [19]

Klessig

[11] 4,077,602
[45] Mar. 7, 1978

[54] ACTUATING VALVE

[75] Inventor: Clarence Edward Klessig, Sheboygan, Wis.

[73] Assignee: Kohler Co., Kohler, Wis.

[21] Appl. No.: 700,911

[22] Filed: Jun. 29, 1976

[51] Int. Cl. ............................................. F16k 31/124
[52] U.S. Cl. .......................................... 251/25; 4/374; 251/46; 251/89
[58] Field of Search .................... 251/25, 28, 43, 45, 251/46, 89; 4/18, 18 A, 41, 43, 44, 45, 46, 48, 50, 52

[56] References Cited

U.S. PATENT DOCUMENTS

| 1,614,468 | 1/1927 | Haas | 251/46 |
| 1,643,500 | 9/1927 | Jacobson et al. | 251/45 |
| 2,377,227 | 5/1945 | Griswold | 251/25 |
| 2,411,748 | 11/1946 | Kelley | 251/25 |
| 2,655,172 | 10/1953 | Owens | 251/43 |
| 2,691,504 | 10/1954 | Jones | 251/46 |

*Primary Examiner*—Martin P. Schwadron
*Assistant Examiner*—G. L. Walton
*Attorney, Agent, or Firm*—Thad F. Kryshak

[57] ABSTRACT

An actuating valve serves as a pilot to a control valve for a valve controlled flushing system for a tank-type toilet installation which comprises a siphon flush valve, and a control valve that allows supply water to flow into the tank to initiate siphonic action, to supplement flow through the siphon flush valve and to refill the tank, which control valve utilizes a piston which is ordinarily seated in a closed position by supply line pressure. The actuating valve is located in a bypass passage between the supply pressure and a timing pressure chamber of a control valve. The actuating valve comprises a triggering mechanism, a valve housing, an internal passageway through the valve housing for the flow of supply water and the transfer of supply line pressure, valve means positioned in said housing which upon activation of the triggering mechanism interrupts the flow of supply water and the transfer of supply line pressure through the passageway until the pressure on the piston of the control valve is relieved, the timing pressure chamber is emptied, and the control valve is opened to initiate a flushing cycle and means for disengaging the triggering mechanism to prevent premature or improper use from interfering with the completion of the initiated flushing cycle.

7 Claims, 13 Drawing Figures

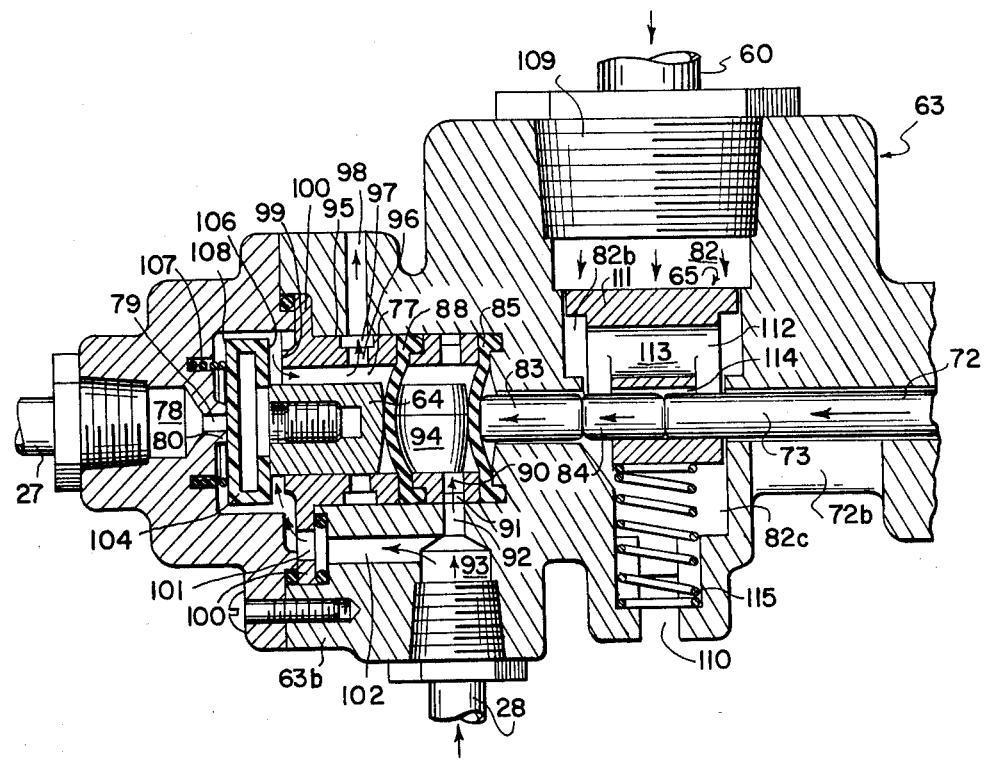
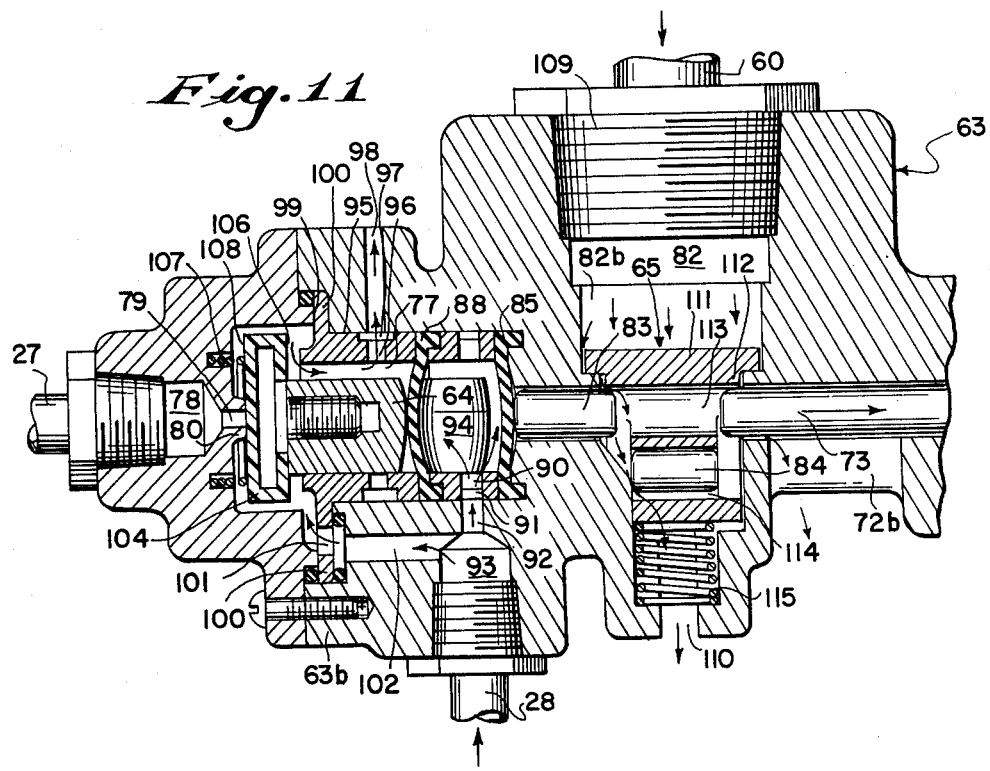

ACTUATING VALVE

BACKGROUND OF THE INVENTION

Tank-type toilet installations are, of course, widely used, particularly for residential installations. At the present time most such toilets have flushing systems comprised of a float controlled water supply valve, an overflow pipe, a large ball-type flush valve and an actuating lever for lifting the ball valve off its seat to initiate the flushing cycle. Such flushing systems normally operate satisfactorily, but have some disadvantages. For example, most homeowners are aware that if the float controlled water supply valve fails to close satisfactorily the water continues to run, overfilling the tank and leaving by the overflow pipe thereby resulting in a substantial waste of water. Furthermore, the float controlled water supply valve which depends upon the water level in the tank to remain closed is also ineffective in preventing the property damage that can result in the event the water tank cracks or springs a leak. Still further, the float controlled water supply valve is subject to opening by the "water hammer effect" which also can result in a substantial waste of water.

The large ball-type flush valve employed in most residential toilet tank installations also has its disadvantages. The ball-type flush valve many times fails to seat properly causing leakage of tank water into the water closet bowl and a waste of water. In addition, many of the malfunctions that occur with the conventional residential tank flushing systems are due to the mechanical linkages between the ball-type flush valve and the actuating lever which raises the ball from its valve seat and permits the flushing cycle to be initiated. As a result, the components of the conventional toilet tank flushing system must be precisely aligned when installed in a tank.

The disadvantages of conventional ball-type flush valves are overcome by siphon-type valves such as that shown in copending U.S. application Ser. No. 642,948, filed Dec. 22, 1975; now Pat. No. 4,024,589 but siphon valves require some reliable means to initiate the siphon action and the disadvantages of the float control remain. All of the noted problems may be cured by doing away with the tank entirely and using a flushometer-type valve to deliver a predetermined quantity of flush water; but this arrangement is generally unsuitable for residential use or any other situation where there is inadequate water supply.

A control valve which operates independent of the tank water level and is particularly adapted for use in a flushing system employing a siphon flush valve is disclosed in the copending application of Peter M. Milnes, Ser. No. 700,912 filed June 29, 1976 for "Valve Controlled Flushing System," now U.S. Pat. No. 4,034,423.

The aforementioned control valve utilizes a pressure biased piston which is ordinarily seated against the water supply by supply line pressure which is transferred by a bypass circuit to a timing pressure chamber behind and exposed to the rear face of the piston. Located in the bypass circuit between the supply pressure and the timing pressure chamber is an actuating valve which ordinarily allows the free flow of line pressure, but which can be triggered to block the transfer of supply line pressure and relieve the pressure on the rear face of the piston thus allowing the piston to be moved by supply line pressure from a closed to an open position and allowing the flow of supply water into the toilet tank. The control valve, because it utilizes water supply line pressure to remain closed, is independent of the water level in the tank, and, therefore, in the event of tank leakage the water loss is restricted to that contained within the tank. This, of course, eliminates the possibility of property damage that could result from the subsequent water flow with a water level controlled valve. In addition, because the supply line pressure is utilized to maintain the piston of the control valve in a closed position, the control valve will not open due to the "water hammer effect" as will float controlled valves which depend upon the water level in the tank to hold them closed against supply line pressure.

SUMMARY OF THE INVENTION

It is the general object of this invention to provide an improved actuating valve which utilizes supply line pressure to function after it has been manually triggered.

The actuating valve is particularly suited for use as a pilot to a control valve for a toilet tank flushing system, which control valve utilizes supply line pressure to maintain a piston seated against the water supply inlet to prevent flow through the control valve. The actuating valve is located in the bypass circuit between the supply pressure and the control valve and comprises a triggering mechanism, a valve housing, an internal passageway through the valve housing for the flow of supply water and the transfer of supply line pressure, valve means positioned in said housing which upon activation of the triggering mechanism interrupts the flow of supply water and the transfer of supply line pressure through the passageway until the pressure on the piston of the control valve is relieved and the control valve is opened and means for disengaging the triggering mechanism until the control valve has been open for a predetermined period of time.

The actuating valve, once it is mechanically triggered, utilizes water supply line pressure to immediately disengage the triggering mechanism and to re-engage it once the flushing cycle has been completed.

In addition, because the actuating valve may be connected to the control valve by flexible tubing, the push button or other triggering device may be positioned almost anywhere on the tank exterior. Furthermore, the use of tubing to connect the valves eliminates the need for precise alignment and location of the system components within the tank and permits the flushing system to be used in almost any configuration of toilet tank.

It is a further object to disclose the specific structure of the actuating valve described in the specification and illustrated in the drawings.

Further general and specific objects and advantages will appear from the description to follow in which for purposes of illustration a preferred embodiment of the invention is described in detail.

BRIEF DESCRIPTION OF THE DRAWINGS

FIG. 10 is an enlarged vertical longitudinal view partially in section, of a portion of the valve housing of the actuating valve during triggering; p FIG. 11 is another enlarged vertical longitudinal view partially in section, of a portion of the valve housing of the actuating valve after triggering;

OPERATION OF THE FLUSHING SYSTEM

Figure 1:
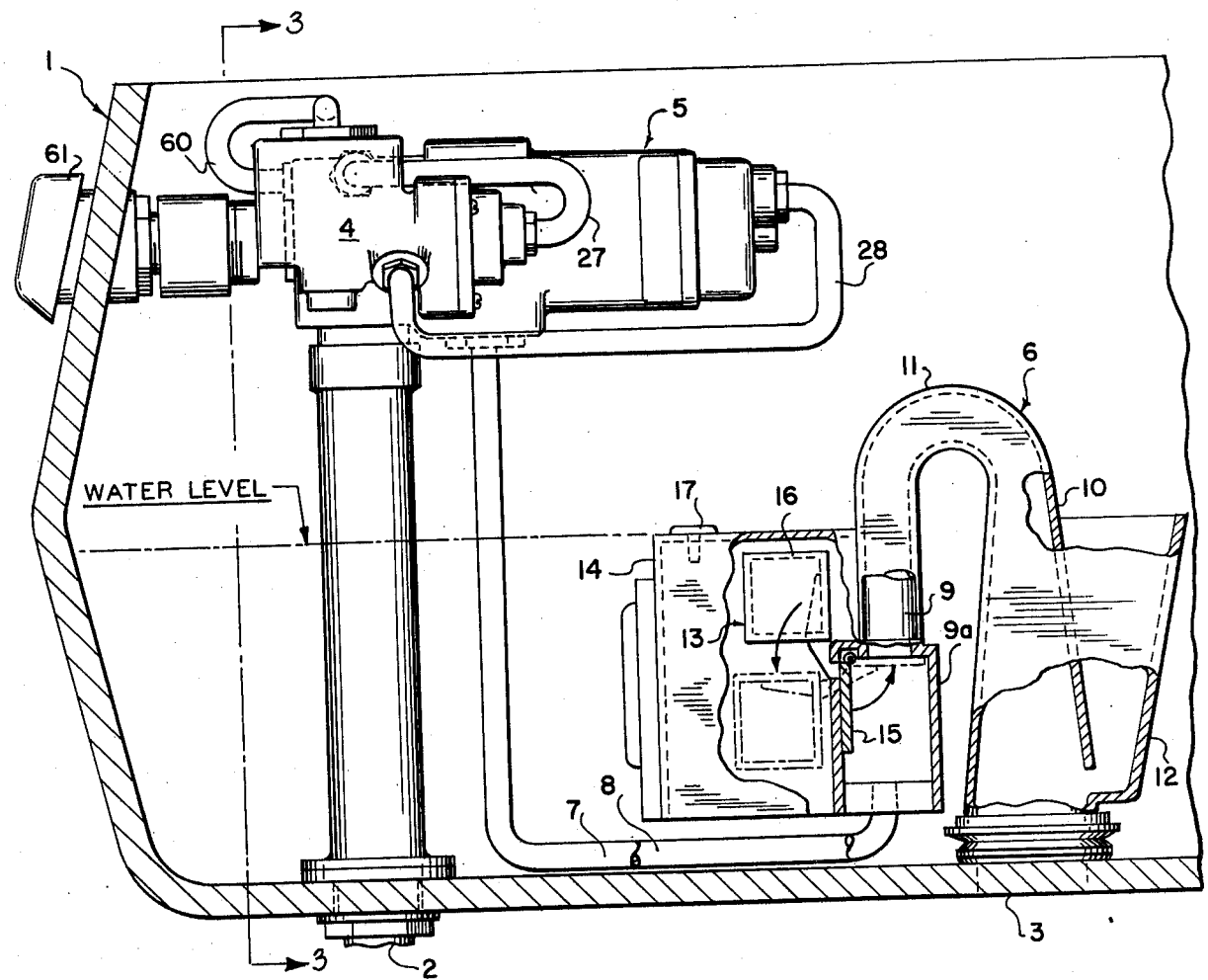
FIG. 1 is a side view in elevation of a toilet tank with a flushing system, partially broken away, incorporating the valve of the invention.
Figure 2:
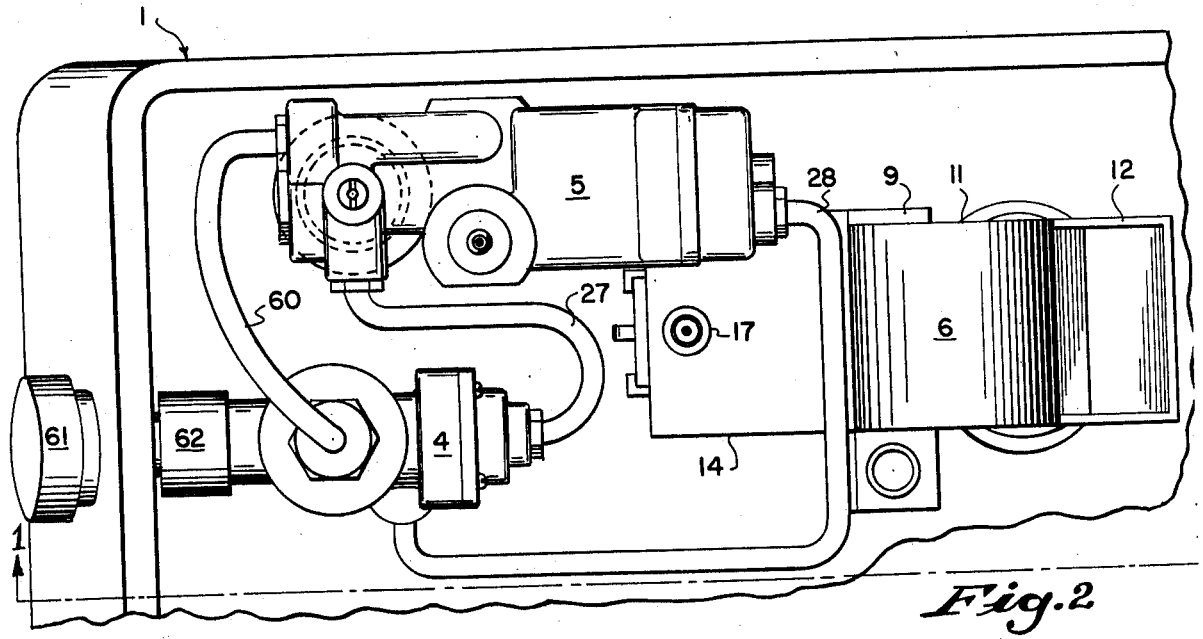
FIG. 2 is a top plan of the toilet tank of FIG. 1 with the cover removed.
Figure 3:
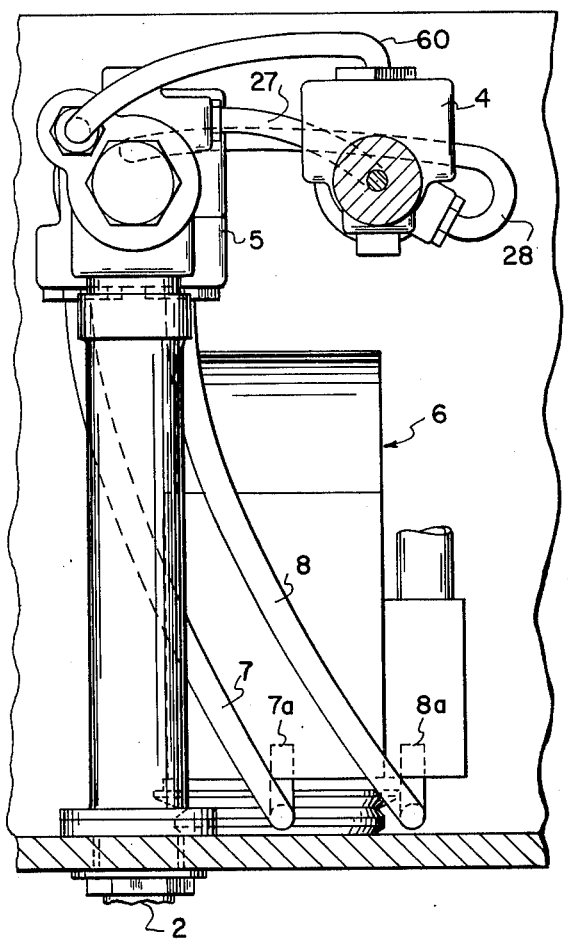
FIG. 3 is a side view in section, taken along lines 3—3 of FIG. 1.

In FIGS. 1 to 3 there is shown a toilet tank 1 having a supply water inlet 2 and a water tank outlet 3 which is connected to the toilet bowl (not shown) and is equipped with a valve controlled flushing system comprised of an actuating valve 4 mounted on the side wall of the toilet tank, a control valve 5 connected to the water supply inlet, and a siphon-type flush valve 6. The actuating valve 4 is connected to the control valve 5 by tubing and the control valve 5 has a pair of water supply outlets 7, 8 that lead to the flush valve 6.

As seen in FIG. 1, the flush valve 6 is essentially an inverted U-shaped body having an open upleg 9, a downleg 10 connected to the tank outlet 3 and a connecting loop 11. The flush valve is also provided with an overflow 12, a flap-float unit 13 and a float chamber 14. The flap portion 15 of the flap-float unit 13 is positioned in a widened portion 9a of the upleg and the float portion 16 is housed in the float chamber 14 which is provided with an air bleed valve 17. The flap-float unit 13 is pivotably attached so that it can swing from the position shown in broken lines to that shown in unbroken lines.

When a toilet tank equipped with the described flushing system is filled with water to the level indicated by the broken lines shown in FIG. 1, the system is in readiness to initiate a flushing cycle. The flushing cycle is initiated by triggering the actuating valve 4 which in turn causes the control valve 5 to open so that supply water flows through and out of the control valve 5 via the water supply outlets 7, 8 to a pair of jet nozzles 7a, 8a which direct high velocity jets of water up the upleg 9 of the siphon-type flush valve 6. The jet of water from nozzle 7a not only flows through the upleg 9, loop 11 and downleg 10 but also acts as a pump forcing the tank water over the connecting loop 11 and down the downleg 10 driving the air from and entirely filling the U-shaped body with water, thereby initiating a siphonic action which in conjunction with the pumping effect of the jet rapidly transfers the water from the tank of the toilet into the toilet bowl (not shown). The transfer of water provides a rapid rise in the bowl water level, a desirable characteristic, which enhances waste removal, improves water conservation and shortens the flush cycle.

The second outlet 8 and jet nozzle 8a are optional, depending on the type of water closet used and are employed where it is desired to provide a rim wash of the toilet bowl, as in one-piece water closets.

When the water level in the tank falls below the lower edge of the float chamber 14, the chamber empties of water and the float 16 of the flap-float unit falls to the position indicated in broken lines in FIG. 1, causing the flap 15 to swing up and to seat across the internal opening of the widened portion of the upleg 9a as indicated in broken lines, thereby stopping the flow of water through the flush valve 6. However, the supply water continues to enter the tank through the control valve 5 and the jet nozzles 7a, 8a and it is diverted by the flap 15 to fill the tank with water. As the water level in the tank rises, water rises in the float chamber 14, forcing air contained therein through the air bleed valve 17. After the water level in the tank once again approaches that shown in FIG. 1, the supply water continues to enter the tank for a predetermined period of time so that a sufficient supply of water leaves the tank by the overflow 12 to establish a water seal in the toilet bowl (not shown). The control valve 5 then shuts off the flow of supply water to the tank and the buoyant float 16 resumes its original position in the float chamber 14 and in so doing swings the flap 15 away from its seat in the widened portion of the upleg 9a and into its original position shown in unbroken lines in FIG. 1. At this time, the actuating valve 4 may be triggered to initiate another flushing cycle.

As previously mentioned, the siphon flush valve 6 is the subject of a separate patent application, Ser. No. 642,948, filed Dec. 22, 1975, which is incorporated by reference herein. Although the use of the described siphon valve is preferred, other siphon valves with integral or separate means of diverting flow may be employed.

THE CONTROL VALVE

The preferred embodiment of the control valve is illustrated in FIGS. 4-8 of the drawings.

Figure 4:
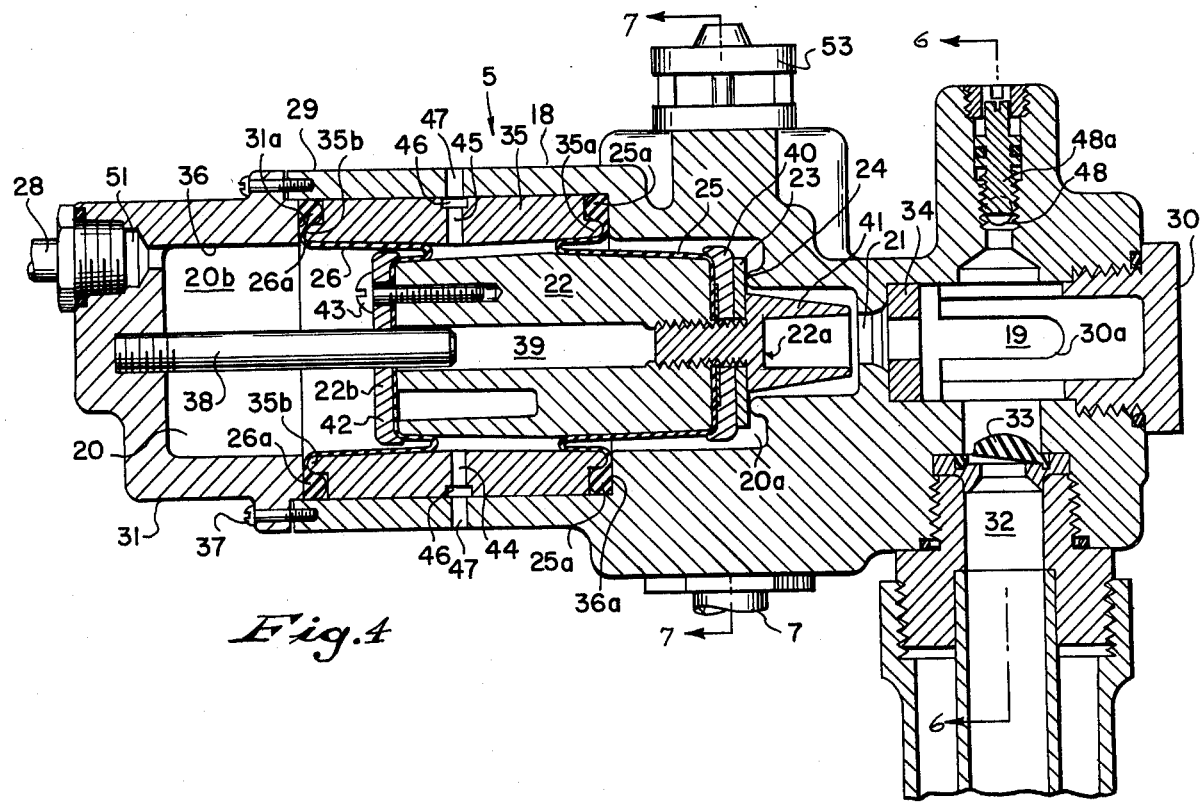
FIG. 4 is an enlarged vertical longitudinal view in section, of the control valve in the closed position and the supply water inlet.
Figure 5:
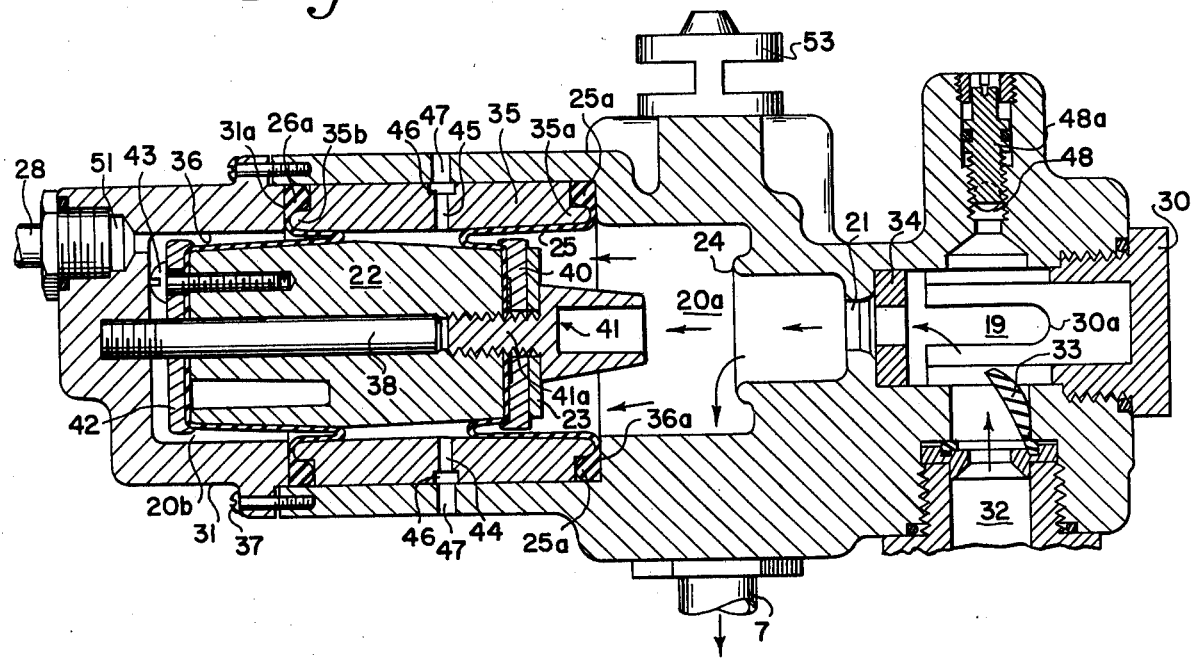
FIG. 5 is a vertical longitudinal view in section, of the control valve in open position.
Figure 8:
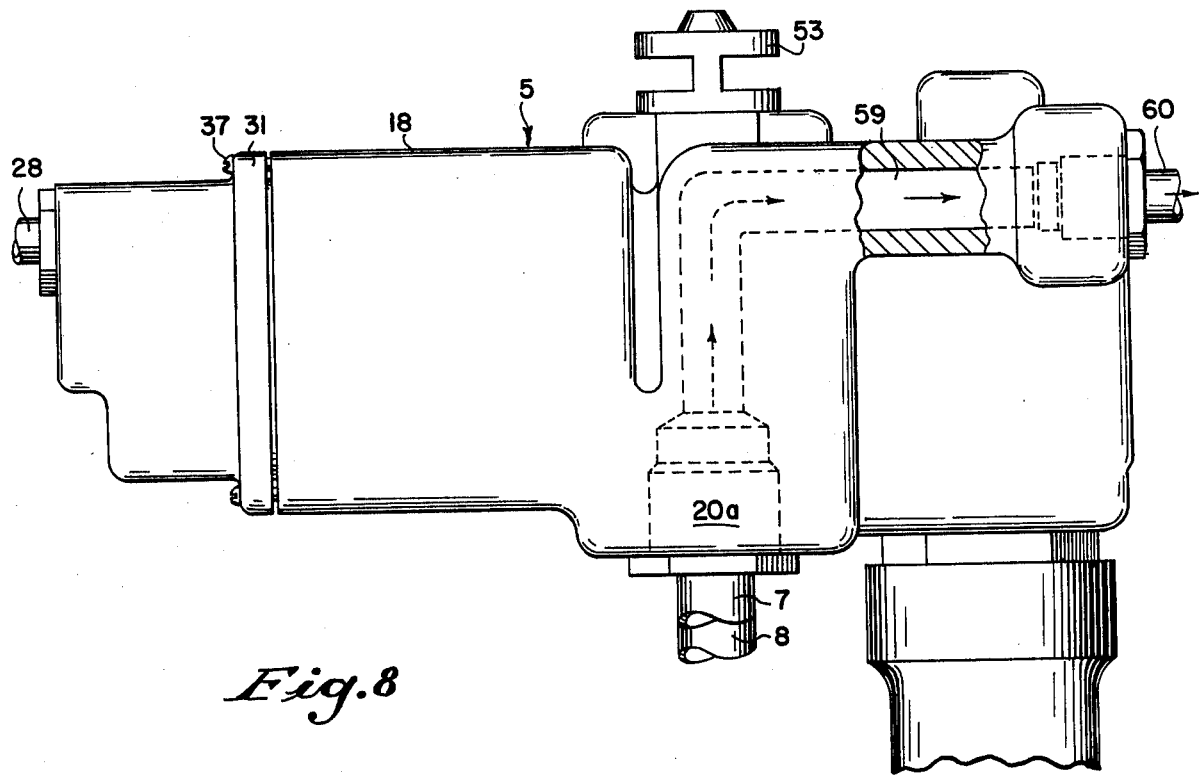
FIG. 8 is an enlarged longitudinal view partially in section of the control valve.

In FIGS. 4 and 5 of the drawings, it can be seen that the control valve 5 comprises a valve body 18 having a hollow interior divided into an inlet chamber 19 and a piston chamber 20 which are connected by a passageway 21. A piston 22 which is adapted for reciprocal movement is positioned in the piston chamber 20. The front face 22a of the piston is provided with sealing means 23 which is adapted to seat upon a valve seat 24 which surrounds the exit of the passageway 21 into the piston chamber 20.

The front face 22a of the piston is separated from the rear face 22b by a pair of rolling diaphragms 25 and 26 which also divide the piston chamber 20 into two separate subchambers of variable volume; an outlet chamber 20a communicating with the passageway 21 and the outlets 7 and 8, and a timing pressure chamber 20b to receive bypass line pressure which can be sensed by the rear face 22b of the piston 22.

As long as the supply line pressure on the rear face 22b of the piston 22 is not relieved, the piston 22 is maintained in the closed position as shown in FIG. 4 in which the effective surface of the rear face 22b of the piston 22 is larger than the effective surface area of the front face 22a exposed to supply line pressure. When the piston is in the position seen in FIG. 4, no water will flow through the control valve and into the tank.

A bypass circuit comprised of the tubes 27 and 28 and the actuating valve 4 ordinarily allows the free transfer of supply line pressure to the pressure chamber 20b and onto the rear face 22b of the piston 22. However, when the actuating valve 4 is triggered, the transfer of supply line pressure via the bypass circuit is blocked and simultaneously the pressure upon the rear face 22b of the piston is relieved which allows the supply line pressure on the effective surface of the front face 22a of the piston to move the piston to the position seen in FIG. 5 and to force all water in the pressure chamber 20b behind the rear face 22b of the piston out of the chamber. When the piston 22 is in the position shown in FIG. 5, supply water flows from the inlet chamber 19 through the passageway 21 into the outlet chamber 20a and out of the outlets 7 and 8 (seen in FIG. 7) to the jets 7a and 8a to initiate siphonic action through the flush valve 6.

When the valve is open as seen in FIG. 5, the pressure in chamber 20a is lower than supply pressure because of the open outlets 7, 8; and when the bypass passage is no longer blocked and supply pressure is sensed at the face 22b, the piston 22 will move toward the right. As it approaches the passageway 21, the face 22a will begin to sense a pressure appoximating supply pressure, but this occurs essentially only in an area corresponding to that circumscribed by the seat 24 and the periphery will still feel the lower pressure in the chamber 20a. As a result, there is a higher force on face 22b than on face 22a which causes the face 22a to seat against the seat 24.

The specific details of the construction of the preferred control valve 5 will now be described.

In FIG. 4 it can be seen that the control valve 5 is comprised of a valve housing 29 which has a hollow interior which is closed at one end by a plug 30 and at the other end by a cap 31. The hollow interior of the resulting valve body 18 is divided into the inlet chamber 19 having an inlet port 32 and the piston chamber 20 which has the pair of outlets 7 and 8 previously described. The two chambers are separated by the passageway 21.

A one-way flap valve 33 is positioned in the inlet port 32. The valve 33 is not an essential element of the valve 5 but, it is included as it is required by the plumbing codes in some communities in order to prevent tank water from being siphoned into the water supply system.

Extending into the inlet chamber 19 is the threaded plug 30 which not only forms the end wall of the chamber 19, but also retains a flow control device 34 is place within the inlet chamber 19. The use of the flow control device 34 is optional but preferred as it prevents water flow through the system from exceeding a predetermined rate. An excessive flow rate may result in a too noisy condition during the flush cycle and create a too violent water action in the water closet. The flow control device 34 is of a resilient material which as flow rates increase deforms to restrict flow. A suitable flow control device is available from Vernay Labs., Yellow Springs, Ohio.

Figure 6:
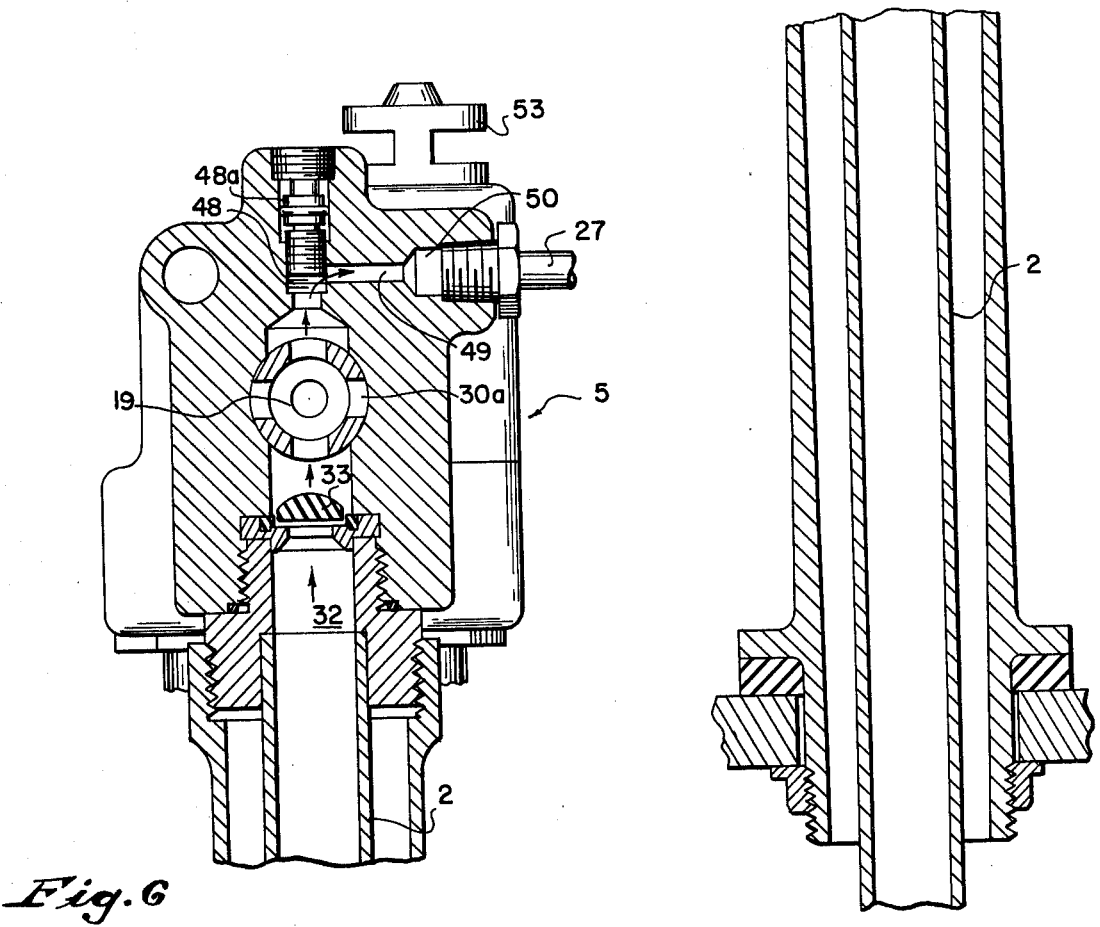
FIG. 6 is a view in section, taken along lines 6—6 of FIG. 4.

As seen in FIGS. 4, 5 and 6, the plug 30 is hollow and has a plurality of openings 30a extending through its walls to permit the free flow of supply water from the inlet port 32 into and out of the chamber 19.

In FIGS. 4 and 5, it can be seen that at the other end of the housing 29 is the cap 31 which not only forms the end wall of the pressure chamber 20b but which also retains a hollow sleeve 35 which forms part of the interior wall 36 of the piston chamber 20 within the hollow interior of the valve housing 29. The cap 31 is secured to the valve housing 29 by threaded screws 37 or other suitable means.

As seen in FIGS. 4 and 5, the piston 22 is guided in movement within the piston chamber by a pin 38 which extends from the cap 31 into the pressure chamber 20b. The pin 38 enters into and cooperates with a matching axial bore 39 in the body of the piston 22 to keep the piston centered within the hollow interior of the piston chamber 20.

In the event that a symmetrically balanced outlet system from the chamber 20a is provided which keeps the piston 22 centered within the piston chamber 20 as it moves so that there is not excessive wear of the diaphragms 25 and 26 which are of a flexible elastomer material, the pin 38 and the bore 39 may be omitted.

Turning again to FIGS. 4 and 5, it can be seen that a fluid tight seal between the rolling diaphragm 25 and the interior wall 36 of the piston chamber 20 is obtained by clamping a peripheral bead 25a of the diaphragm 25 in a circumferential groove formed by an end contour 35a of the sleeve 35 and an annular step 36a in the interior wall 36 of the valve housing 29. The central portion of the rolling diaphragm 25 is held against the piston 22 by a small cap 40 which conforms to the shape of the diaphragm 25 and to the shape of the front face of the piston 22.

Overlying the small cap 40 is the sealing means 23 which is preferably in the form of a washer of resilient material. The small cap 40, the sealing means 23 and the diaphragm 25 are secured to the front of the main body of the piston 22 by a dash pot member 41 which has a threaded stem 41a which extends through the central apertures (not shown) in the cap 40, the sealing means 23 and the diaphragm 25 and is threaded into the main body of the piston 22.

As seen only in FIG. 4, when the valve 5 is closed, the main body of the dash pot member 41 is in an enlarged area of the passageway 21 and the sealing means 23 is seated upon the valve seat 24 which surrounds the exit of the passageway 21 into the piston chamber 20. When the valve is in this position, the effective surface area of the front end of the piston assembly which is exposed to supply pressure is that portion of the front face 22a of piston 22 bounded by the internal diameter of valve seat 24. The tapered side walls and central recess of the dash pot member 41 cooperate with the interior walls of the enlarged portion of the passageway 21 to cushion and silence the closing of the valve 5.

Returning again to FIGS. 4 and 5, it can be seen that a fluid tight seal between the second of the rolling diaphragms 26 and the interior wall 36 of the piston chamber 20 is obtained by clamping the bead 26a between a circumferential groove formed by the end contour 35b of the sleeve 35 and an annular step 31a of the interior of the large cap 31 which closes the end of the housing 29. The rolling diaphragm 26 is held against the rear face 22b of the piston by a small cap 42 which overlies the central portion of the diaphragm 26 and conforms to the shape of the end of the piston 22. The cap 42 is secured to the main body of the piston by threaded screws 43. The pin 38 which guides the piston 22 extends through the central apertures (not shown) in the diaphragm 26 and the cap 42 and into the axial bore 39 in the body of the piston 22.

In FIGS. 4 and 5, it can also be seen that the sleeve 35 is provided midway between the contours 35a and 35b with two diametrically opposed bleed holes 44 and 45, each of which communicates with an external, circumferential groove 46 in the sleeve 35. The external groove 46 is aligned with bleed holes 47 which lead to the external surface of the valve body. The purpose of the bleed holes 47 is to prevent a pressure or vacuum buildup in the cavity formed by the spaced apart rolling diaphragms 25 and 26 as a result of changing pressures in chambers 20a and 20b.

When the control valve 5 is in the closed position seen in FIG. 4, the supply line pressure is simultaneously transferred through the bypass circuit to the pressure chamber 20b and on into the rear face 22b of the piston to maintain the sealing means 23 seated against the valve seat 24. The path by which the pressure is transferred through the control valve 5 to the bypass circuit is shown in FIG. 6. The supply pressure is transferred from the inlet port 32 and through the inlet chamber 19, through a variably restrictable orifice 48 into a passageway 49 and through a bypass outlet 50 via tubing 27 to the actuating valve 4, through the actuating valve 4 and back to the control valve via tubing 28, through a bypass inlet 51 in the cap 31 and into the pressure chamber 20b and upon the rear face 22b of the piston 22.

In the embodiment shown in FIGS. 4, 5 and 6, the size of the variable orifice 48 is controlled by the use of a threaded member 48a. As soon as pressure is relieved upon the rear face 22b of the piston and the pressure chamber 20b has been emptied of all water, the supply water starts to flow through the bypass circuit to refill the pressure chamber 20b. The length of time it takes to fill the pressure chamber 20b and as a result the length of time the control valve 5 remains open, are determined by the size of the orifice 48. The provision of the variably restrictable orifice 48 thus makes it possible to adjust the flush cycle timing to achieve the required water seal in a given water closet regardless of supply pressure or bowl design, thereby substantially reducing excessive water usage.

Figure 7:
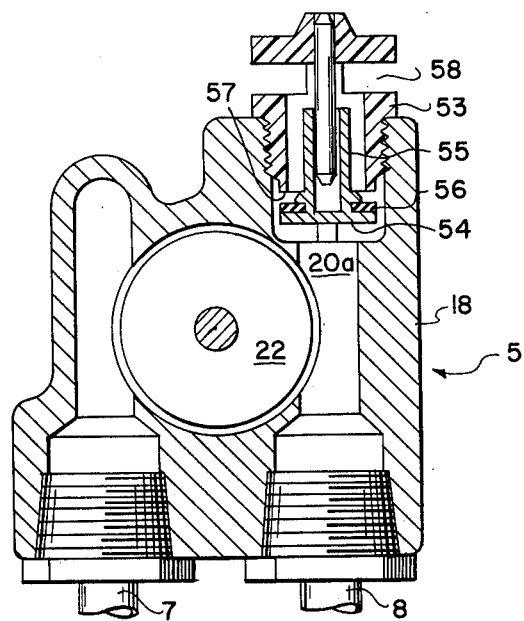
FIG. 7 is a view in section, taken along lines 7—7 of FIG. 4.

As seen in FIG. 7, the preferred embodiment of the control valve has incorporated therein a check valve 53 to provide the air gap required by anti-siphon code requirements. The check valve 53 operates in the following manner. The back pressure created at the jets 7a and 8a forces supply water into the uppermost portion of the outlet chamber 20a where the supply pressure acts upon the surface 54 causing the poppet assembly 55 to move in an upward direction until a seal washer 56 makes contact with a seating surface 57, thus preventing supply fluid from being discharged through apertures 58.

Once the flush cycle is complete and the pressure in the upper portion of the outlet chamber 20a and the outlet tubes 7 and 8 is dissipated, the poppet assembly 55 drops down to its normally open position thus providing the air gap required by anti-siphon code requirements.

The control valve just described can be employed with known actuating valves or other actuating devices. However, when it is desired to use the preferred actuating valve 4 the control valve 5 must be provided with a passageway 59 seen only in FIG. 8 to provide water to disengage the triggering mechanism.

THE ACTUATING VALVE

The preferred embodiment of the actuating valve 4 is shown in FIGS. 1-3 and 9-13.

In FIGS. 1, 2 and 3, it can be seen that the actuating valve 4 is positioned so that a push button 61 of a triggering mechanism 62 is located outside of the tank and the major portion of the valve 4 including a valve housing 63 is positioned within the tank interior. It can also be seen that the actuating valve 4 is connected to the control valve by the three pieces of tubing 27, 28 and 60.

When the push button 61 of the triggering mechanism 62 of the actuating valve 4 is depressed, the flow of supply water and the transfer of supply line pressure through a passageway in the interior of the valve housing 63 is blocked by a poppet assembly 64, as seen in FIG. 10, and the transfer of supply line pressure to the control valve via the tubing 28 is interrupted. The poppet assembly 64 is maintained in position blocking the passageway until the chamber 20b is emptied and pressure is relieved on the rear face 22b of the piston 22 of the control valve 5. When the pressure is relieved, the supply line pressure exerted on the front face 22a moves the sealing means 23 of the piston 22 from its seat 24 and permits supply water to flow through the control valve 5 and via the outlet tubes 7 and 8 and the nozzles 7a and 8a, seen only in FIG. 3, to the flush valve 6 to initiate the previously described flushing cycle.

Once the flushing cycle has been started, the back pressure created at the nozzles 7a and 8a forces supply water from the outlet chamber 20a of the control valve through the passageway 59 into the large tubing 60 and to the actuating valve 4, where after the push button 61 has been released, it moves a second poppet assembly 65 to disengage the triggering mechanism 62 as seen in FIG. 11.

The specific details of the construction of the actuating valve will now be described in detail.

Figure 9:
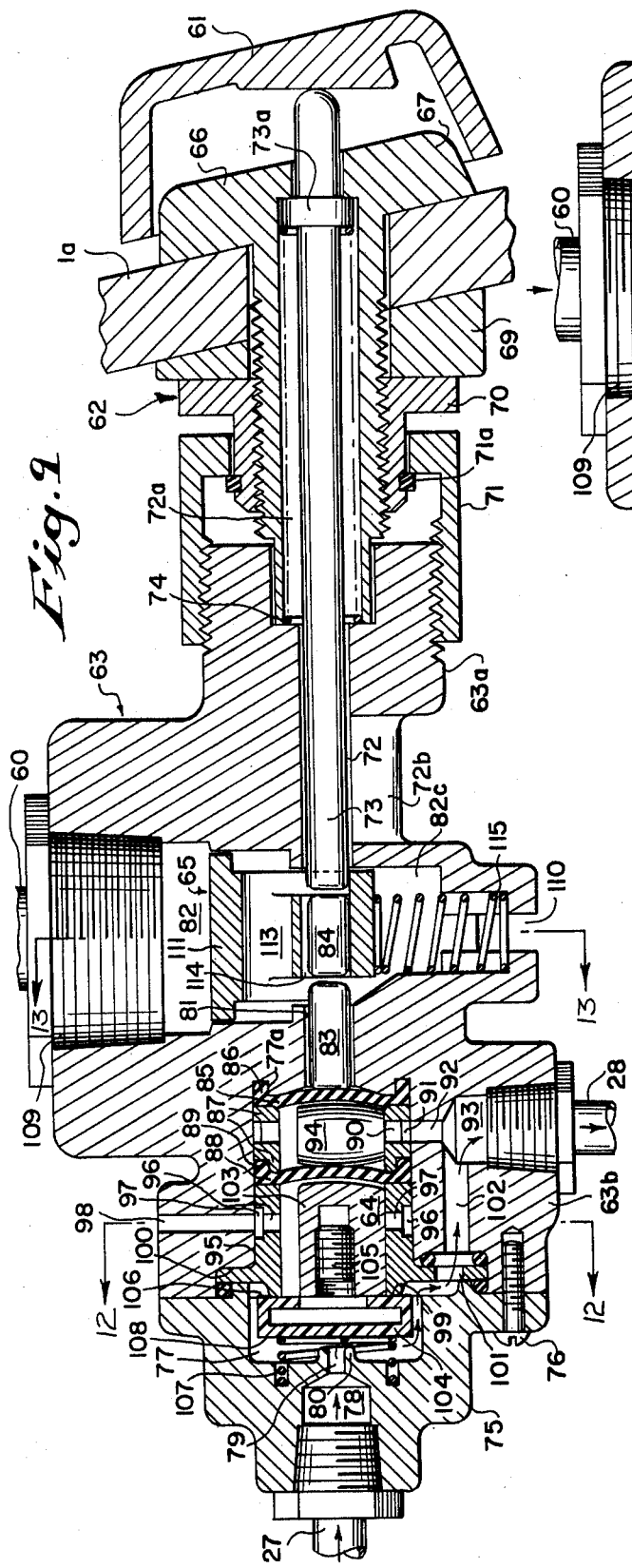
FIG. 9 is an enlarged vertical longitudinal view partially in section, of the actuating valve prior to triggering or at completion of flush cycle.

Turning to FIG. 9, it can be seen that the actuating valve 4 is comprised of two main components; the triggering mechanism 62 and the valve housing 63. The triggering mechanism 62 extends through the wall of the tank 1 and is comprised of a member 66 having an enlarged head 67 which is located outside the tank 1 and a threaded stem 68 which extends through the tank wall and into the tank interior. Cooperating with the threaded stem 68 to secure the triggering mechanism 62 in the wall of the tank are a spacer 69 and a threaded nut 70. Joining the threaded nut 70 to the threaded end 63a of the valve housing is a threaded collar 71 which bears against a retaining ring 71a positioned in a circumferential groove in threaded nut 70. Positioned within an axial bore 72 and extending through openings in the member 67, the threaded stem 68, the spacer 69, the threaded nut 70, the collar 71, and the threaded end of the valve housing 63a is a movable triggering pin 73. The triggering pin 73 is longer than the bore 72 and extends a sufficient distance outside of the tank wall to contact the undersurface of the push button 61. Positioned intermediate the length of the bore 72 in an enlarged portion 72a of the bore 72 is a spring 74 which cooperates with a collar 73a on the triggering pin 73 to return the pin to the position seen in FIG. 9, when the depressing pressure is no longer exerted on the push button 61.

As seen in FIGS. 9, 10 and 11, the valve housing 63 is connected at one end 63a to the triggering mechanism 62. The other end 63b of the valve housing is closed by a cap 75 which is secured to the main part of the valve housing, preferably by screws 76. The hollow interior of the valve housing and interior configuration of the cap 75 combine to form a longitudinally extending chamber 77 in the valve body. Extending through the cap 75 and communicating with the chamber 77 is a bypass inlet port 78 which is connected to the tubing 27. Surrounding the restricted entrance 79 of the bypass inlet port 78 into the chamber 77 is the valve seat 80. The end wall of the chamber 77 which is opposite the bypass inlet port 78 is provided with a centrally located bore 81 which extends from the chamber 77 to a cavity 82 which is located intermediate the length of the valve housing 63.

As seen in FIG. 9, a movable pin 83 is positioned in the bore 81 and is aligned with a second movable pin 84 which is positioned in the poppet 65. Both the pins 83 and 84 are aligned with the triggering pin 73 which extends from the cavity 82 to the push button 61. When the triggering device is depressed, the triggering pin 73 moves horizontally moving the pins 83 and 84 in the same direction as seen in FIG. 10.

Returning to FIG. 9, it can be seen that the end wall of the internal chamber 77 opposite the wall containing the bypass inlet port 78 is closed in a fluid tight manner by a diaphragm 85 having a peripheral bead 86. The diaphragm 85 is of resilient material and possesses a memory so that when not subjected to pressure it always returns to the position shown in FIG. 9. The peripheral bead 86 of the diaphragm 85 is received in a matching groove 77a in the end wall of the chamber 77 and the diaphragm 85 is retained in the position seen by a sleeve 87 which fits tightly within the chamber 77. The open end of the sleeve 87 is closed by a second diaphragm 88 which also has a peripheral bead 89 which is received in the end contour 87a of the sleeve 87.

The compartment formed by the two diaphragms 85 and 88 and the sleeve 87 is fluid tight except for passageways 90 which extend through the side wall of the sleeve 87 and communicate with a circumferential groove 91 which communicates with a passage 92 which leads to a bypass outlet port 93 that communicates with tubing 28. Positioned between the diaphragm 85 and the diaphragm 88 and within the interior of the sleeve 87 is the spacer 94. The diaphragm 88 is retained within the chamber 77 by a sleeve 95 which is retained within the chamber 77 by the cap 75. The sleeve 95 retains the bead 89 of the diaphragm 88 in fluid tight relationship with the end contours 87a of the first sleeve 87.

As seen in FIG. 9, the sleeve 95 is provided with a pair of bleed holes 96 which extend through the side wall of the sleeve 95 and are connected by a circumferential groove 97 which communicates with an opening 98 in the valve housing 63. The other end of the sleeve 95 is provided with an annular valve seat 99 which extends around the periphery of the opening of the sleeve 95. Adjacent this end of the sleeve 95 there is also provided an externally projecting flange 100. Extending through the flange 100 is a restricted opening 101 which communicates with a passage 102 that leads to the outlet port 93 and the tubing 28.

Figure 12:
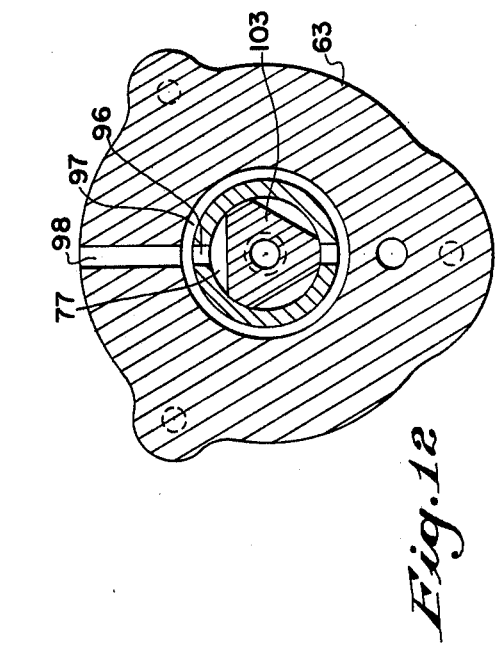
FIG. 12 is a view in section taken along lines 12—12 of FIG. 9.

In FIG. 9 it can be seen that the poppet 64 has a stem 103 and a head 104. The head 104 of the poppet 64 is substantially larger than the stem 103 and is attached to the stem by a threaded connection 105. The undersurface 106 of the head 104 of the poppet is of a resilient material that is adapted to form a sealing relationship with the valve seat 99 provided about the end of the sleeve 95. As seen in FIG. 12, the stem 103 is preferably of a triangular cross-section so that water can flow, with minimal resistance, through the internal cavity of the sleeve 95.

Returning to FIG. 9, it can be seen that the undersurface 106 of the head 104 of the poppet 64 is maintained in a seated position upon the valve seat 99 by a spring 107. The top surface 108 of the poppet head 104 is also of a resilient sealing material.

Turning to FIG. 10, it can be seen that when the actuating valve 4 is triggered, the pin 73 moves the pin 84, the pin 83, the diaphragm 85, the spacer 94, the diaphragm 88 and the poppet 64 to bring the top surface 108 of the poppet head 104 to seating relationship with the valve seat 80.

As seen in FIG. 11, the poppet 64 is maintained in position with the top surface 108 seated on the valve seat 80 by the diaphragm 88 as the result of back pressure exerted within the chamber formed by the diaphragms 85 and 88 and the sleeve 87. The valve components are maintained in the position seen in FIG. 11 until all pressure is relieved on the rear face 22b of the piston 22.

Figure 13:
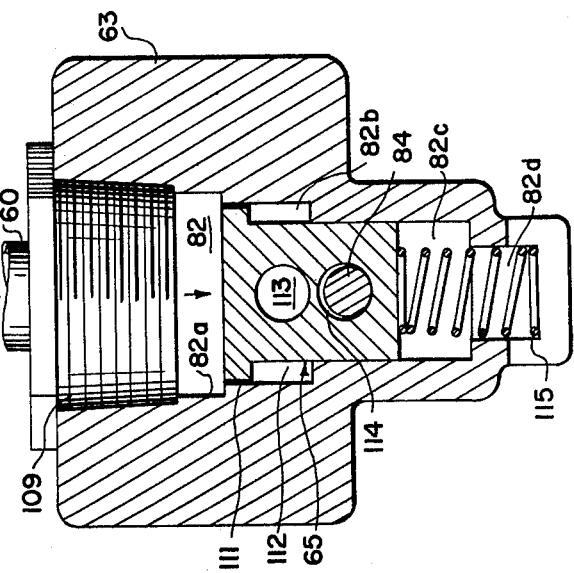
FIG. 13 is a view in section taken along lines 13—13 of FIG. 9.

Turning now to FIG. 13, it can be seen that the cavity 82 is a stepped cylindrical bore having an enlarged cylindrical top portion 82a, a smaller, cylindrical shaped first intermediate section 82b, a still smaller, generally cylindrical shaped second intermediate section 82c and a still smaller, cylindrical bottom section 82d. The top of the cavity 82 and a substantial portion of the upper portion 82a are closed by a threaded closure 109 through which the tubing 60 extends to communicate with the interior of the cavity 82. The bottom portion 82d of the cavity is provided with an outlet opening 110 (seen in FIGS. 9, 10 and 11). Positioned in the cavity 82 is the poppet assembly 65 having a flanged top 111 which is positioned in the first intermediate section 82b, and a cylindrical stem 112 which is positioned in the second intermediate section 82c. As seen in FIGS. 9 and 13, two parallel bores 113 and 114 extend transversely through stem 112; a top pinless bore 113 and a lower bore 114 which contains the pin 84. It can also be seen that the poppet 65 is supported in the cavity 82 by a spring 115.

The operation of the actuating valve and its unique features will now be described in conjunction with a description of the operation of the control valve.

OPERATION OF THE VALVES

When the water level in the tank 1 is as indicated in FIG. 1, the control valve 5 is closed as seen in FIG. 4, the actuating valve 4 is in the pretriggering condition shown in FIG. 9, and the supply line pressure is transferred from the inlet chamber 19 of the control valve 5 through the restricted orifice 48, through the passageway 49, as indicated by the small arrows in FIG. 6, to the tubing 27, to the bypass inlet 78 of the actuating valve 4. Upon entering the actuating valve 4, the supply water and the pressure flow through the restricted entrance 79 into the chamber 77 and around the lower edge of the head 104 of the poppet 64, through the restricted opening 101 in the flange 100 of the sleeve 95, through passageway 102 and the bypass outlet port 93 of the actuating valve 4, as indicated by the small arrows in FIG. 9. It then flows via the tubing 28 to the timing pressure chamber 20b of the control valve 5 where it is sensed by the rear face 22b of the piston 22. As long as the pressure on the rear face 22b of the piston is not relieved, the control valve 5 remains closed.

Turning now to FIG. 10, it can be seen that when the triggering mechanism 62 is activated, the triggering pin 73 is moved as are the pins 84 and 83 which are aligned with the triggering pin 73. When this occurs, the pin 83 in the end wall of the chamber 77 is moved horizontally by the pin 84 to deform the first diaphragm 85 causing the spacer 94 to be moved horizontally and to move the second diaphragm 88 which in turn moves the poppet assembly 64. As a result, the sealing undersurface 106 of the head 104 of the poppet 64 is moved off its valve seat 99, the spring 107 is compressed and the sealing top surface 108 of the poppet 64 is seated on the valve seat 80 surrounding the opening 79 thereby cutting off the flow of supply water and the transfer of supply line pressure through the bypass circuit to timing pressure chamber 20b in control valve 5. When this occurs, the supply line pressure is relieved on the rear face 22b of the piston 22 of the control valve and the sealing means 23 of the piston 22 is moved off the seat 24 so that supply water can flow through the passageway 21 into the chamber 20a and out of the outlets 7 and 8 to the jets 7a and 8a and the flush valve 6.

As the piston 22 is moved rearward in the timing pressure chamber 20b, the water therein is forced out the bypass inlet 51 through the tubing 28 to the bypass outlet 93 of the actuating valve 4. When the water enters the actuating valve 4 is passes through the passageway 92 into the compartment formed by the two diaphragms 85 and 88 and the sleeve 87. The water also passes through the passageway 102 into and through the restricted opening 101 and into the main portion of the internal chamber 77 of the actuating valve 4. It then flows into the compartment formed by the outside diameter of the stem 103 of the poppet 64 and the internal diameter of the sleeve 95 and leaves that compartment through the bleed holes 96 connecting the internal diameter of the sleeve 95 to the circumferential groove 97. The groove 97 is aligned with a bleed hole 98 that leads through the body of the valve 4. Thus, the water that was once in the pressure chamber 20b behind the piston is eventually forced through the actuating valve 4 and into the water tank. The route taken by the water is indicated by the small arrows in FIG. 10.

As seen in FIG. 11, the upper surface 108 of the poppet assembly 64 is retained against the valve seat 80 about the bypass inlet opening 79 by the back pressure in the compartment formed by the two diaphragms 85 and 88 and the sleeve 87, created as a result of the restricted flow through opening 101. The back pressure acts upon the diaphragms 85 and 88 which are of sufficient area to provide a force large enough to overcome the opposing force created by the spring 107 and the supply pressure acting on the top surface 108 of the poppet 64 within the confines of the valve seat 80. The pressure differential on the poppet assembly 64 is maintained until the pressure created by the emptying of the pressure chamber 20b is completely dissipated at which time the poppet 64 is forced by the spring 107 to be reseated against the valve seat 99 as seen in FIG. 9.

Once this occurs, the timing pressure chamber 20b of the control valve is completely empty and it begins to refill at the rate determined by the size of the restricted orifice 48. As the timing pressure chamber 20b is filling, the piston 22 moves toward the position shown in FIG. 4 until the control valve 5 is closed. The piston 22 is slowed in its closing by the contours of the dash pot member 41. The tapered walls of the member 41 and its cup-like recess cooperate with the enlarged portion of the passageway 21 which it enters to slow and silence the closing of the valve 5.

Once the actuating valve 4 is triggered and released, the pressure is relieved in the timing pressure chamber 20b and the piston 22 is forced to the rear of the pressure chamber 20b, as seen in FIG. 5, supply water flows through the outlets 7, 8 and through the jet nozzles 7a and 8a to the flush valve 6 to initiate the siphonic action and the flushing cycle. Then as a result of the back pressure created at the jet nozzles 7a and 8a, the triggering mechanism of the actuating valve is disengaged by supply water which is forced from the top of the outlet chamber 20a and into the relatively large passageway 59 seen in FIG. 8 and via the tubing 60 through the closure 109, into the vertically extending cavity 82 and upon the upper flanged top 111 of the poppet 65, depressing the poppet so that the bottom of the flanged top 111 engages the bottom of the internal cavity 82b and at the same time compresses the spring 115. When this occurs, the second or pinless bore 113 in the poppet 65 is aligned with the triggering pin 73 and the pin 83 as seen in FIG. 11 thus disengaging the triggering mechanism. As the result, when the poppet 65 is thus positioned, accidental or premature depression of the push button 61 moves the free end of the triggering pin 73 ineffectually into the pinless bore 113. Therefore, once the flushing cycle is in progress, the depression of the push button 61 cannot interfere with the completion of the flushing cycle.

As seen in FIG. 11, the supply water exerting pressure on the top of the poppet 65 can leak past the top flange 111 and out the opening 110 and into the tank 1, as well as into the bore 72 and into the tank through the opening 72b. Therefore, once the flow of supply water into the cavity 82 stops, the spring 115 returns the poppet 65 to the position seen in FIG. 9. The pin 84 is thus moved back into alignment with the triggering pin 73 which was returned to its position seen in FIG. 9 by the spring 74 as soon as the push button 61 was released and the pin 83 which was returned to its original position by the diaphragm 85. Once the various components have resumed their positions seen in FIG. 9, the actuating valve can be triggered to initiate another flushing cycle.

From the foregoing description it will be apparent that the novel actuating valve of the present invention offers significant advantages when employed with the control valve and flushing valve described. Not only does the actuating valve disclosed eliminate the need for supplemental power sources, but it also makes it possible for the push button to be positioned almost anywhere on the tank exterior. The use of tubing to connect the valves eliminates the need for precise alignment and location of the valves within the tank thereby easing the assembly and subsequent replacement of parts, and permitting the flushing system to be employed in almost any configuration of toilet tank.

It will be readily apparent to those skilled in the art, that the foregoing description has been solely for the purposes of illustration and that modifications and changes may be made without departing from the spirit and scope of the invention. For example, the relative sizes and shapes of the various components, as well as their location in the tank may be varied so long as such changes do not interfere with their function. The invention is not, therefore, intended to be limited by the showing or description herein, or in any other manner, except insofar as may specifically be required.

I claim:

1. In a control system for a siphon-type flush valve which control system comprises a control valve which utilizes supply line pressure upon the rear face of a piston positioned in the control valve to stop the flow of supply water through the control valve, a bypass circuit to transfer supply line pressure to the rear face of the piston, and an actuating valve which upon triggering interrupts the transfer of pressure through the bypass circuit, the improved actuating valve which comprises:
   (a) a triggering mechanism;
   (b) a valve housing having an internal passage for the transfer of supply line pressure therethrough;
   (c) valve means positioned in said housing adapted to be seated by the triggering mechanism to interrupt the transfer of supply line pressure through said passage; and
   (d) means for holding said valve means in a position restricting flow through said passage, which means include a flexible diaphragm which as the result of back pressure created by the flow from the rear face of the piston through a restricted orifice exerts force on said valve means when the control valve is opening.

2. In a control system for a siphon-type flush valve, which control system comprises a control valve which utilizes supply line pressure upon the rear face of a piston positioned in the control valve to stop the flow of supply water through the control valve, a bypass circuit to transfer supply line pressure to the rear face of the piston, and an actuating valve which upon triggering interrupts the transfer of pressure through the bypass circuit, the improved actuating valve which comprises:
   (a) a triggering mechanism;
   (b) a valve housing having an internal passage for the transfer of supply line pressure therethrough;
   (c) valve means positioned in said housing adapted to be seated by the triggering of the triggering mechanism to interrupt the transfer of supply line pressure through said passage, said valve means including a poppet assembly which is moved upon triggering of the triggering mechanism by a series of individual pins positioned in their own individual bores to a seating position; and
   (d) means for holding said valve means in a position restricting flow through said passage, said means is actuated by pressure from the rear face of the piston when the control valve is opening.

3. In a control system for a siphon-type flush valve, which control system comprises a control valve which utilizes supply line pressure upon the rear face of a piston positioned in the control valve to stop the flow of supply water through the control valve, a bypass circuit to transfer supply line pressure to the rear face of the piston, and an actuating valve which upon triggering interrupts the transfer of pressure through the bypass circuit, the improved actuating valve which comprises:
   (a) a triggering mechanism;
   (b) a valve housing having an internal passage for the transfer of supply line pressure therethrough;
   (c) valve means positioned in said housing adapted to be seated by the triggering of the triggering mechanism to interrupt the transfer of supply line pressure through said passage, said valve means including a poppet assembly which is moved upon triggering of the triggering mechanism by a series of individual pins positioned in their own individual bores to a seating position;
   (d) means for holding said valve means in a position restricting flow through said passage, said means is actuated by pressure from the rear face of the piston when the control valve is opening and
   (e) means for disengaging the triggering mechanism which include a second poppet assembly which contains one of said pins and which is moved so that the pin is out of alignment by back pressure created as the result of flow through the control valve.

4. An actuating valve which can be used as pilot valve for a fluid control valve which is maintained in a closed position by supply line pressure comprises:
   (a) a triggering mechanism;
   (b) a valve housing having an inlet port adapted to be connected to a source of supply line pressure, an outlet port adapted to be connected to a control valve and an internal passage in the housing for the transfer of supply line pressure therethrough;
   (c) valve means positioned in said housing adapted to be seated by the triggering of the triggering mechanism to interrupt the transfer of supply line pressure through said passage and to the control valve via the outlet port; and
   (d) means for holding said valve means in a position restricting flow through said passage which means include a flexible diaphragm which as the result of back pressure created by flow from the rear face of the piston through a restricted orifice exerts a force on said valve means when the control valve is opening.

5. An actuating valve which is intended to serve as a pilot valve for a control valve, which control valve utilizes supply line pressure to maintain a piston seated against a fluid supply inlet to prevent flow through the control valve, is adapted to be located in a bypass passage between the supply line pressure and the control valve and comprises:
   (a) a triggering mechanism;
   (b) a valve housing having an inlet port adapted to be connected to the source of supply line pressure, an outlet port adapted to be connected to the control valve and an internal passage for the transfer of supply line pressure through the housing;
   (c) valve means positioned in said housing adapted to be seated by the triggering of the triggering mechanism to interrupt the flow of supply water and the transfer of supply line pressure through the passage, said valve means including a poppet assembly which is moved upon the triggering of the triggering mechanism by a series of individual pins each positioned in its own individual bore, which pins are aligned so that the movement of the triggering mechanism moves the pins to move the poppet; and
   (d) means for holding the valve means in a position restricting flow through said passage, said means is actuated by pressure from the rear face of the piston when the control valve is opening.

6. An actuating valve which can be used as a pilot valve for a fluid control valve which is maintained in a closed position by supply line pressure comprises:
   (a) a triggering mechanism;
   (b) a valve housing having an inlet port adapted to be connected to the source of supply line pressure, an outlet port adapted to be connected to the control valve and an internal passage for the transfer of supply line pressure through the housing;

(c) valve means positioned in said housing adapted to be seated by the triggering of the triggering mechanism to interrupt the transfer of supply line pressure through said passage, said valve means including a poppet assembly which is moved upon triggering of the triggering mechanism by a series of individual pins positioned in their own individual bores to a seating position;

(d) means for holding said valve means in a position restricting flow through said passage, said means is actuated by pressure from the rear face of the piston when the control valve is opening and (e) means for disengaging the triggering mechanism which include a second poppet assembly which contains one of said pins and which is moved so that the pin is out of alignment by back pressure created as the result of flow through the control valve.

7. An actuating valve includes:

(a) a valve housing having an internal passageway therethrough for the flow of supply water and the transfer of supply line pressure;

(b) valve means positioned within said housing which means can be actuated by the triggering mechanism to interrupt the flow of supply water and transfer of supply line pressure through the passageway;

(c) a triggering mechanism comprising a series of pins each positioned in its own individual bore, said pins and bores being aligned prior to triggering so that upon triggering of the mechanism the pins are moved to actuate the valve means; and (d) means for disengaging the triggering mechanism once it has been triggered, said means comprising a poppet assembly which contains one of the series of pins and which is moved as a result of the interruption of the flow of supply water and transfer of the supply line pressure through the passageway so that the pin is out of alignment and the triggering mechanism cannot actuate the valve means.

* * * * *